Dec. 25, 1956  H. POMERNACKI  2,775,041
GEAR TESTING APPARATUS
Filed March 30, 1954  4 Sheets-Sheet 1

INVENTOR.
Henry Pomernacki
BY
Olson & Trexler
attys.

Dec. 25, 1956 H. POMERNACKI 2,775,041
GEAR TESTING APPARATUS
Filed March 30, 1954 4 Sheets-Sheet 2
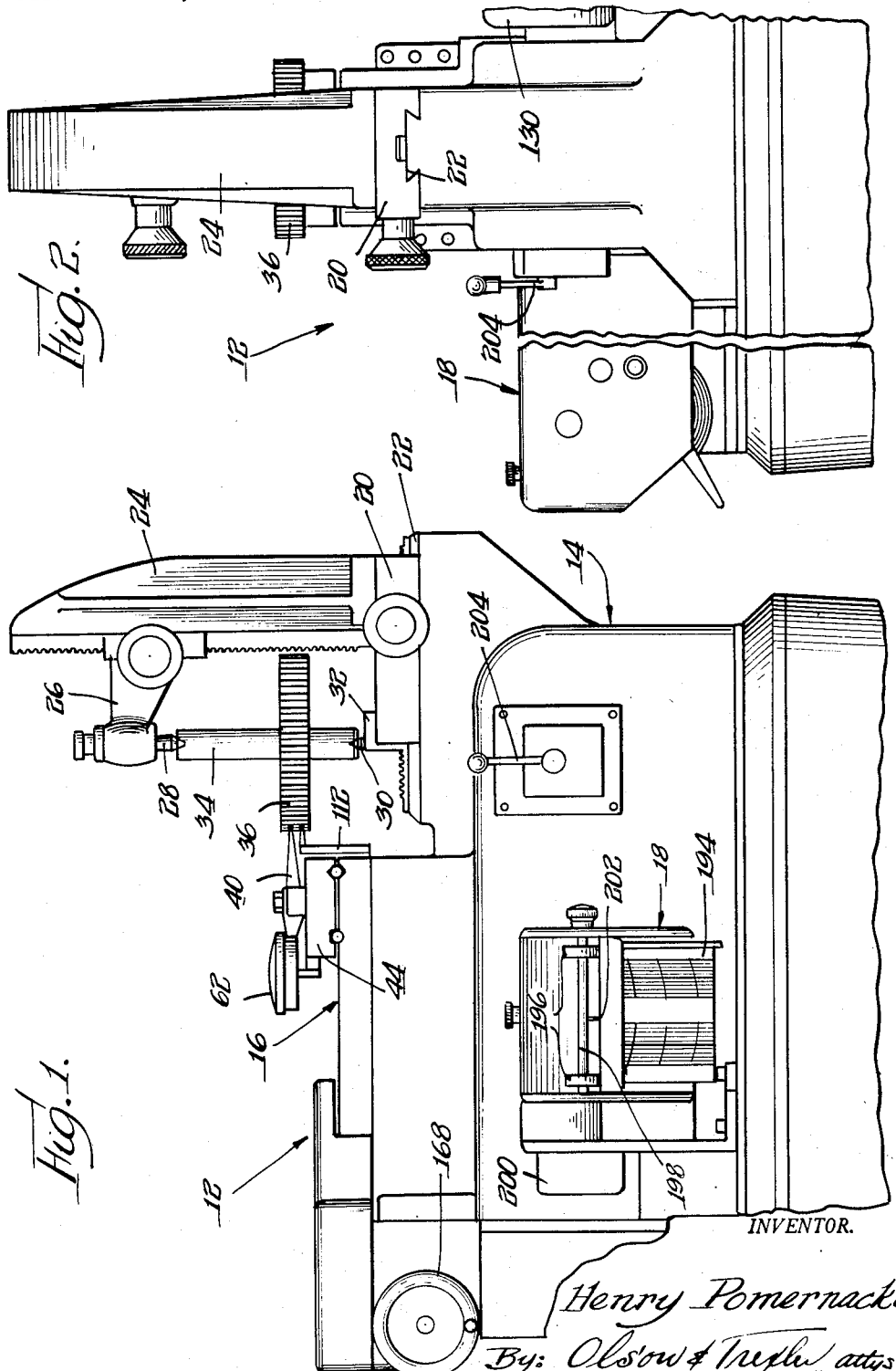
INVENTOR.
Henry Pomernacki
By: Olson & Trexler attys.

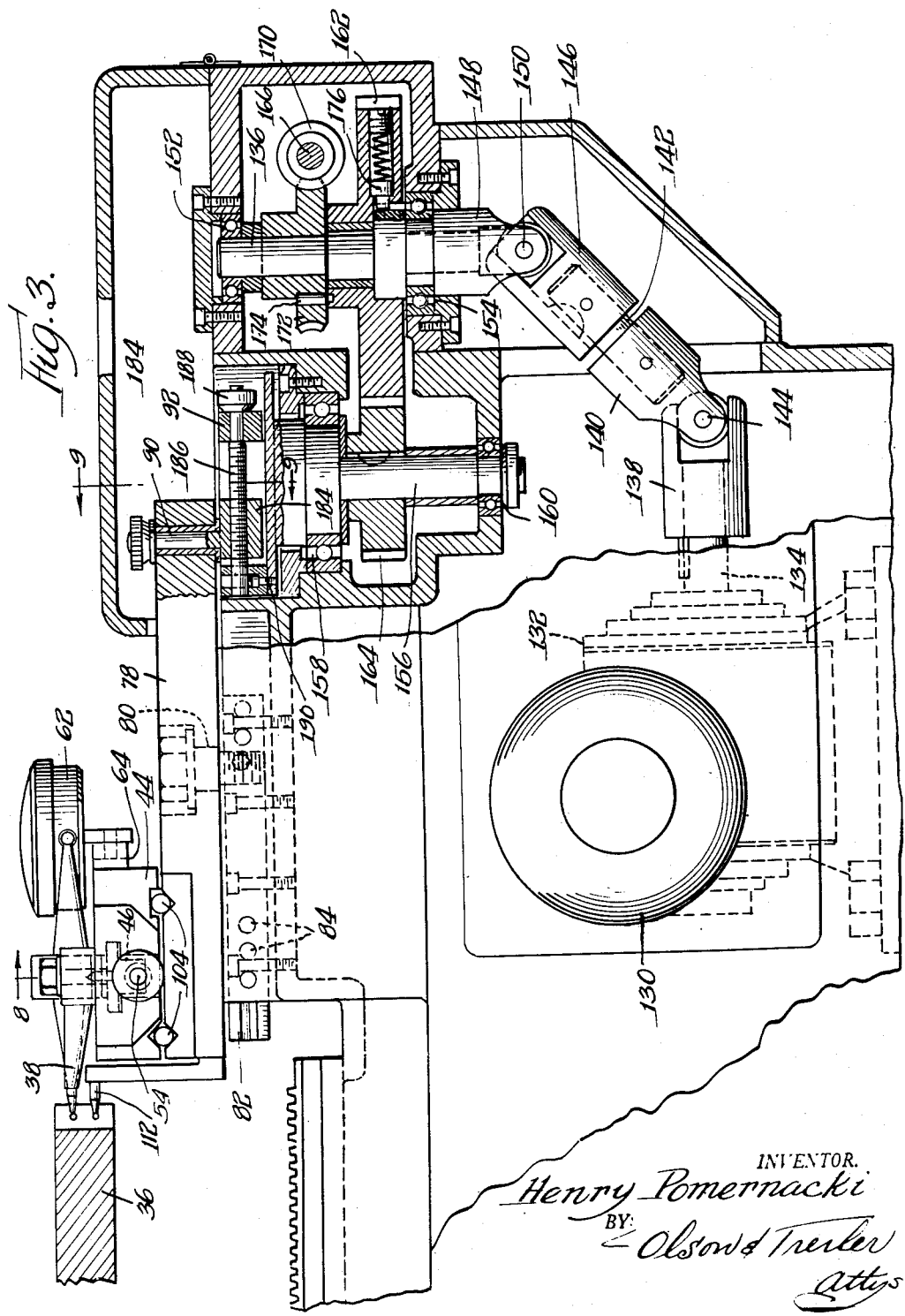

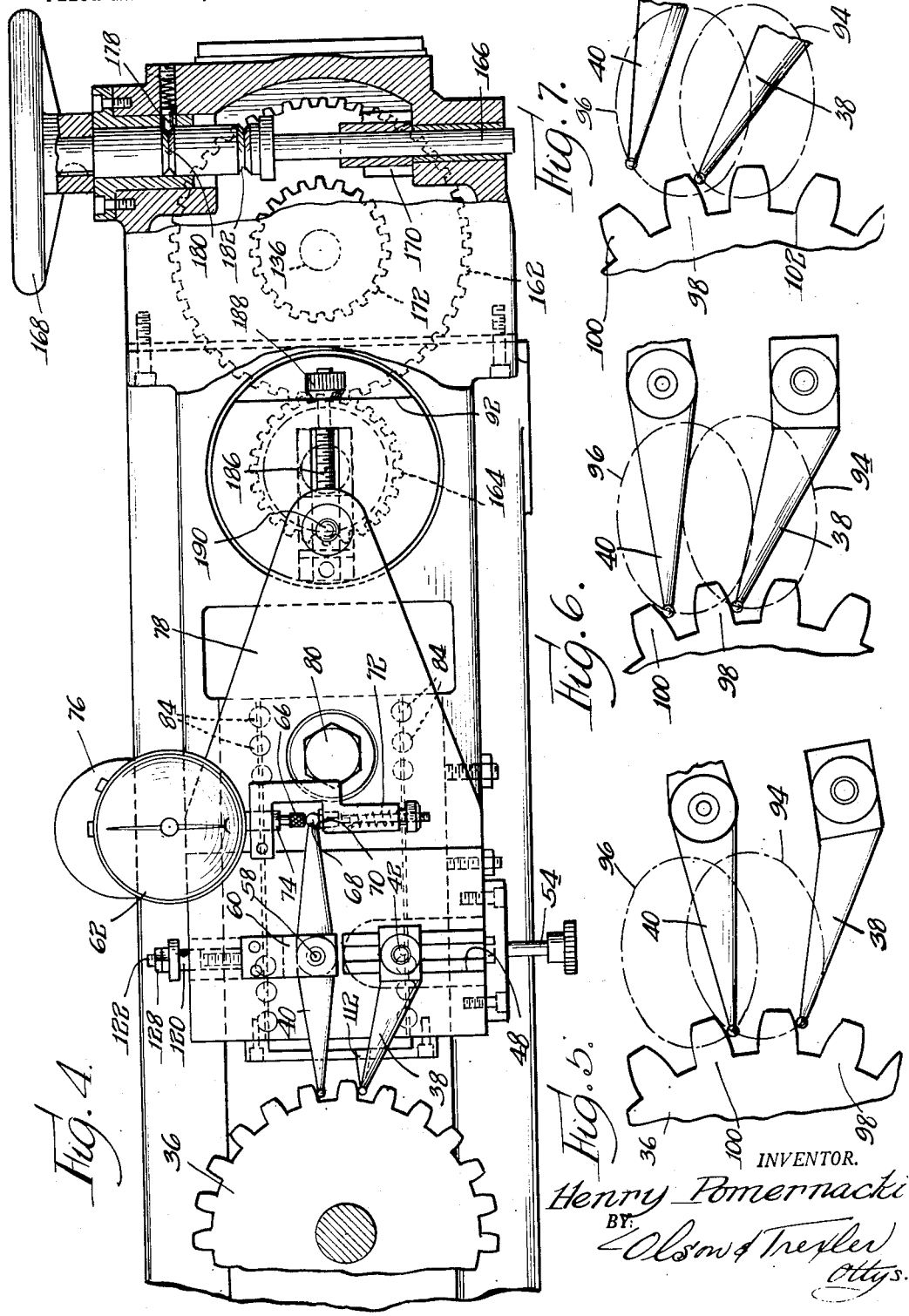

United States Patent Office 2,775,041
Patented Dec. 25, 1956

2,775,041

GEAR TESTING APPARATUS

Henry Pomernacki, Chicago, Ill., assignor to Illinois Tool Works, Chicago, Ill., a corporation of Illinois Application March 30, 1954, Serial No. 419,716

11 Claims. (Cl. 33—179.5)

The present invention relates to a novel apparatus for checking gears or similar work pieces and more particularly to a novel apparatus for checking the tooth spacing around the work piece.

Apparatus including a pair of relatively movable contact fingers has heretofore been proposed for use in checking tooth spacing of gears and like work pieces. These fingers have generally been mounted for straight line reciprocating movement into and out of contact with the work piece. Hand operated reversible drive means is usually provided for reciprocating the fingers and some more or less complicated means is provided for indexing the gear or work piece for successively locating the gear teeth in position to be checked. While such prior known machines have many valuable uses the operation thereof is relatively slow. It is therefore a primary object of the present invention to provide a novel machine for checking tooth spacing automatically and relatively rapidly and economically.

Another object of the present invention is to provide a novel apparatus for checking gears or the like automatically and for recording the results of the checking operation.

More specifically, it is an object of the present invention to provide a novel apparatus for automatically checking and indexing a gear or similar work piece to facilitate economical operation.

A still further object of the present invention is to provide a novel apparatus of the above described general type wherein means for checking and indexing the work piece may be operated at variable lineal speeds to promote rapid and accurate checking or testing of the work piece.

Other objects and advantages of the present invention will become apparent from the following description and the accompanying drawings wherein:

Fig. 1 is a side elevational view of an apparatus embodying the principles of this invention;

Fig. 2 is an end elevational view of the novel apparatus of this invention;

Fig. 3 is an enlarged fragmentary elevational view of the side opposite from the side shown in Fig. 1 and partially broken away to illustrate certain structural features more clearly;

Fig. 4 is a fragmentary plan view of that portion of the apparatus shown in Fig. 3;

Figs. 5 through 7 are fragmentary schematic plan views illustrating the manner in which the novel apparatus of this invention operates;

Figure 8:
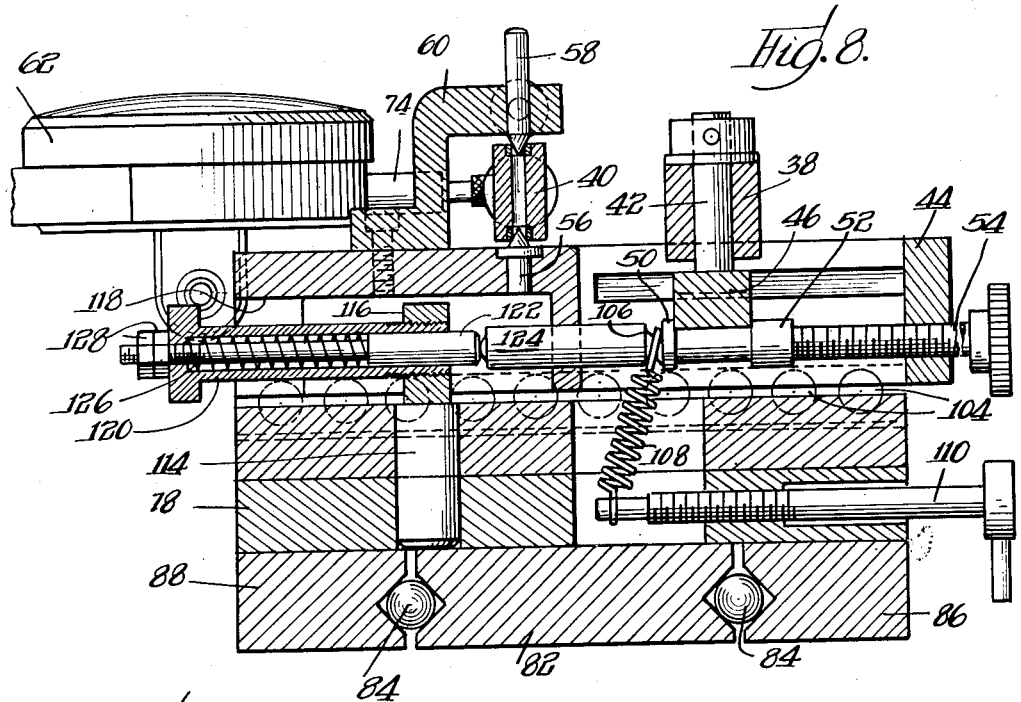
Fig. 8 is an enlarged vertical cross-sectional view taken along line 8—8 in Fig. 3.

Referring now more specifically to the drawings wherein like parts are designated by the same numerals throughout the various figures an apparatus or machine 12 embodying the principles of this invention is shown best in Figs. 1 and 2. The machine 12 includes a stand or base generally designated by the numeral 14, checking means 16 mounted on the base and recording means 18.

The checking means 16 includes a carriage 20 adjustably mounted on a track 22 and supporting a vertical standard 24. An arm 26 is adjustably mounted on the standard and carries a center 28 adapted to cooperate with a center 30 mounted on the carriage 20 by means of a split arbor adapter 32 to support an arbor 34. The arbor is adapted to carry a work piece such as a gear 36.

In accordance with the present invention the checking means 16 is constructed so as to check and index the work piece automatically. Referring particularly to Figs. 3 through 8 it is seen that the means 16 includes a pair of fingers 38 and 40 which are adapted to engage the work piece teeth. The finger 38 is connected by means of a pin 42 to a slide block 44. The pin 42 is adjustably mounted on the side block 44 by means of a member 46 disposed within a slot 48 and retained between collars 50 and 52 fixed on a screw member 54 threaded into the block 44. The pin 42 is non-rotatable and the finger 38 is likewise non-rotatably connected to the pin 42 and therefore the pin 38 will hereinafter be refererd to as the fixed finger. On the other hand the finger 40 is pivotally mounted between its ends by a pair of centers 56 and 58 and will hereinafter be designated as the movable finger. The center 56 is seated within a suitable recess formed in the block 44, and the center 58 is mounted to the block 44 by means of a bracket 60.

An indicating dial 62 is mounted to the slide block 44 by means of a bracket 64 and this indicating dial may be of any well known construction including a resiliently biased plunger 66. As shown best in Fig. 4 an end 68 of the movable finger 40 is disposed in engagement with the plunger 66 so that upon movement of the finger in the manner described fully hereinbelow the plunger will be actuated to operate the indicating dial. In order to maintain the finger in engagement with the plunger 66 and to permit the work piece to be checked and rotated in both directions a second spring biased plunger 70 is provided for engaging the end 68 of the finger and opposing the plunger 66. The plunger 70 is mounted in a bracket 72 secured to a tube 74 connected to the dial housing and surrounding the plunger 66. The plunger 66 also operates a standard electrical pickup head 76 secured to the back of the dial indicator which pickup head is operable in a well known manner to actuate the pen of the recording mechanism described more fully hereinbelow.

In accordance with an important feature of the present invention the block 44 and thus the fingers 38 and 40 are carried on one end of a crank arm 78. The crank arm is pivotally mounted by means of a stub shaft 80 to a slide 82. The slide is supported by ball bearings 84 between a pair of guide members 86 and 88. The opposite end of the crank arm is connected to a pin 90 eccentrically mounted on a disc or wheel 92. With this structure it is seen that upon rotation of the disc 92 the crank arm will be both reciprocated toward and away from the work piece and oscillated from side to side. As a result of this compound movement the fingers 38 and 40 respectively travel around the endless generally circular paths indicated by lines 94 and 96 in Figs. 5 through 7. With this movement the fingers are operable not only to check the tooth spacing but also to index the work piece substantially one circular pitch during each cycle. More specifically, the fingers are shown in Fig. 5 just after initial engagement with a pair of teeth 98 and 100 of the work piece. In Fig. 6 the fingers have advanced to the checking position which is preferably substantially at the pitch circle of the work piece. In addition, the work piece has simultaneously been partially indexed. In Fig. 7 the fingers are shown in the position where indexing of the work piece has been completed and the fixed finger 38 is about to disengage from the tooth 98. In this position it is seen that the succeeding tooth 102 is now in position to be engaged by the fixed finger 38. It is thus seen that the apparatus of this invention is capable of simultaneously checking and indexing the work piece whereby the checking operation may be completed relatively rapidly.

While the fixed and movable fingers might be mounted directly on the crank arm, they are preferably mounted in the manner shown best in Fig. 8. More specifically as set forth hereinabove the fingers are mounted on the slide block 44 and in order to prevent injury to the fingers the slide block is yieldably interconnected with the crank arm. Thus the block 44 is supported on the crank arm by means of a plurality of roller bearings 104. The screw member 54 is provided with a groove 106 in which is connected one end of a tension spring 108. The opposite end of the tension spring is connected to a screw member 110 which is threaded into the crank arm 78. By adjusting the screw member 110 in the manner illustrated the tension spring 108 resiliently biases the slide block 44 toward the left as viewed in Fig. 8 and upwardly as viewed in Fig. 4. Thus when the fingers are moved in the direction indicated in Figs. 5 through 7 they are constantly resiliently urged into contact with the work piece by the tension spring 108 to insure accuracy in the checking operation. Furthermore, the tension spring 108 allows the fingers to initially yieldably engage the work piece during each revolution around their endless paths so as to reduce the possibility of injury to the fingers resulting from the relatively large shock or impact upon initial contact with the work piece. In order to further reduce any possibility of injury to the fingers 38 and 40 a relatively heavy finger 112 may be mounted directly to the crank arm 78 as shown best in Figs. 3 and 4. This relatively heavy finger is especially useful when the work piece to be checked is relatively large and heavy since upon initial impact or contact of the fingers 38 and 40 with the work piece they will yield until the heavy finger 112 also engages the work piece thereby relieving them of further strain. It is of course understood that after the heavy finger 112 has initiated the indexing of the work piece the spring 108 will hold the fingers 38 and 40 in firm engagement with the work piece so that accuracy in the checking operation is maintained.

In order to prevent the slide block 44 from moving too far toward the left as viewed in Fig. 8 stop means is provided for limiting such movement. This stop means includes a pin 114 connected to the crank arm 78 and having a nut portion 116 extending upwardly into a slot 118 in the block 44. A hollow sleeve 120 is threaded into the nut portion 116 and slidably supports a plunger 122. The plunger is resiliently urged toward the right for engagement with an enlarged end 124 of the screw member 54 by means of a compression spring 126 within the sleeve member. A pair of jam nuts 128 are threaded onto the stem of the plunger 122 to limit movement of the plunger toward the right. With this structure it is seen that the plunger 122 provides a resilient or yieldable stop to reduce any possibility of injury to the apparatus. Furthermore, it is often desirable to rotate the fingers around their oblong paths in a direction opposite to the direction indicated in Figs. 5 through 7 and the resiliently biased plunger 122 provides for yieldable initial engagement of the fingers with the work piece during such reverse rotation.

The crank arm actuating disc 92 is driven by the means shown best in Fig. 3. This means includes an electric motor 130 which drives a speed reducer 132 of any well known construction. The speed reducer output shaft 134 drives a shaft 136 disposed at an angle thereto through a pair of universal joints. One of the universal joints has a fork member 138 secured to the output shaft 134 and a second fork member 140 secured to an intermediate shaft 142. The forks 138 and 140 may be of any well known construction and are connected together by any well known means such as the cross 144. The other universal joint has similar fork members 146 and 148 connected to the shafts 142 and 136 respectively and interconnected with each other by the usual means such as a cross 150.

The speed reducer output shaft 134 is driven at a constant speed while the contact fingers 38 and 40 are preferably moved at a variable speed. More specifically, the fingers are preferably moved relatively rapidly while they are indexing the work piece and while they are disengaged from the work piece and they are preferably moved relatively slowly while they are in position to check the tooth spacing to promote accuracy in the checking operation and also to allow an operator to read the indicator mechanism or dial 62. In accordance with the present invention the universal joints or couplings are utilized to obtain this varying rate of movement. As will be understood the output shaft 134 drives the intermediate shaft 142 through the first universal joint at a varying angular velocity which varying angular velocity completes two cycles per revolution of the shaft. It should be particularly noted that the fork member 146 of the second universal joint is turned 90° relative to the fork 140 of the first universal joint. With this arrangement the shaft 136 is driven at a varying angular velocity which varies between relatively wide limits since in the particular positions shown, the effect of the two universal joints are additive. Thus, the shaft 136 which is supported in bearings 152 and 154 is driven at a varying angular velocity having two cycles per revolution.

The crank arm actuating disc 92 is connected to the end of a shaft 156 which is rotatably mounted by bearings 158 and 160. The shaft 156 is driven from the shaft 136 through gears 162 and 164. In order to drive the shaft 156 at a varying angular velocity having only one cycle per revolution the gears 162 and 164 are proportioned so that the shafts 156 and 136 are rotated at a 2:1 ratio.

In order to adjust the position of the crank arm and contact fingers by hand for any desired purpose such as to recheck a particular portion of the work piece gear a shaft 166 having a hand wheel 168 thereon is shiftably and rotatably supported as shown best in Figs. 3 and 4. A worm 170 is fixed on the shaft 166 and is adapted to mesh with a worm gear 172 which is rotatably mounted on the shaft 136 but fixed to the gear 162 by a set screw 174. The gear 162 is releasably connected to the shaft 136 by a spring biased pin 176 so that the shaft 136 may be disconnected from the gear and the gear 162 may be rotated by the hand wheel without rotating the shaft 136 and the motor 130. In the position shown in Fig. 4 the hand wheel and worm assembly is out of engagement with the worm gear. The assembly is held in this position by means of a spring biased pin 178 which extends into a groove 180 in a sleeve or enlarged portion of the shaft 166. In order to move the worm 170 into meshing engagement with the worm wheel, the hand wheel assembly is shifted until the pin 178 is in alignment with a second groove 182.

Figure 9:
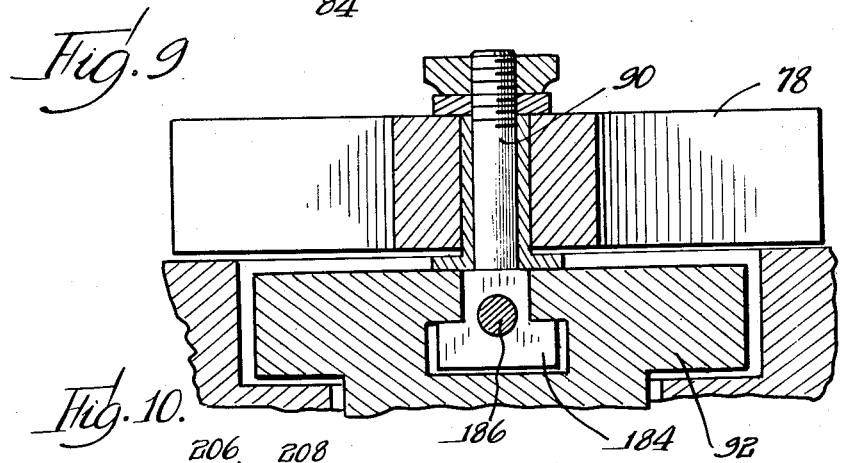
Fig. 9 is an enlarged fragmentary vertical cross-sectional view taken along line 9—9 in Fig. 3.

In order to adjust the movement of the crank arm for different sizes of work pieces the eccentric pin 90 is adjustably connected to the disc 92. More specifically, as shown in Fig. 9 the pin 90 is connected to or made integral with a T-block 184 which is slidably mounted in a suitable slot in the disc. The block 184 threadedly receives a screw member 186 rotatably mounted in the disc and retained against axial movement by a collar 188 pinned thereto. The screw member 186 may be locked in any desired adjusted position by means of a set screw 190. With this structure it is seen that by rotating or turning the screw member 186 the eccentric location of the pin 90 relative to the disc 92 may be adjusted.

The recording means 18 may be of any known construction and therefore need not be described in detail. It suffices to state that the recording means includes means for supporting a roll of graph paper 194 and rollers 196 mounted on a shaft 198 for feeding the paper. The shaft is operatively connected to and driven by a self-starting reversible electric motor 200. A marking pen 202 is operatively supported above the paper and is actuated by electrical drive means, not shown, of well known construction. This drive means may be of any commercially available type adapted to be energized by a signal created by a transformer in the pickup head 76. Of course, a suitable electric circuit including an amplifier is provided for interconnecting the transformer in the pickup head and the pin drive means. In addition, a suitable electric circuit, not shown, is provided for simultaneously controlling the motors 130 and 200. This circuit includes a switch 204 mounted on the side of the machine base.

Figure 10:
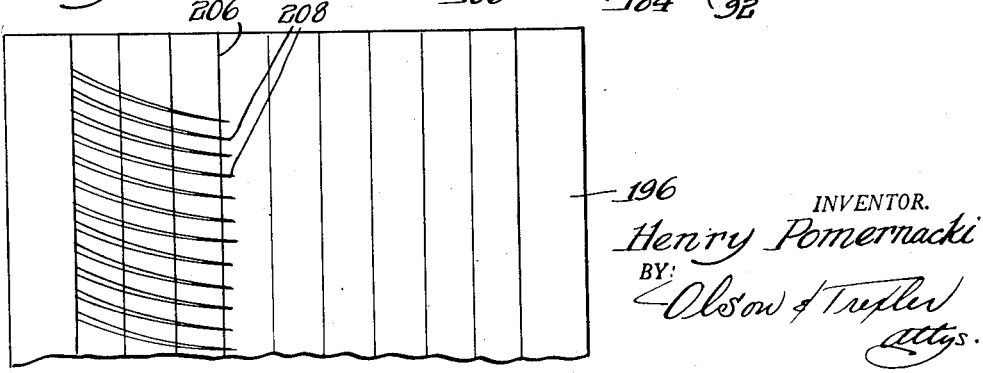
Fig. 10 is a fragmentary plan view showing a typical chart obtained when using the apparatus of this invention.

A brief description of the operation of the above described apparatus is as follows. A work piece is of course first mounted in the apparatus in the manner shown best in Fig. 1. The carriage 20 and the crank arm actuating pin are then adjusted so that the contact fingers may be advanced to substantially the pitch circle of the work piece. In addition, the eccentric actuating pin for the crank arm must be adjusted in accordance with the circular pitch of the work piece and the fixed finger 38 must also be adjusted toward or away from the movable finger in accordance with the circular pitch of the work piece. After these adjustments have been properly made the switch 204 is actuated so that the motors 130 and 200 are energized simultaneously. The contact fingers are moved around the generally oblong endless path in the manner described more fully hereinabove to check the tooth spacing of the work piece and also to index the work piece one circular pitch for each cycle of the contact fingers. At the same time the paper 194 is driven at a predetermined rate past the marking pen and any variation in the tooth spacing of the work piece from the amount to which the fingers 38 and 40 and the indicating head and recording mechanism have been adjusted causes the pen to depart from a base line indicated at 206 in Fig. 10 and trace the illustrated typical graph. In the illustrated typical graph shown in Fig. 10 the points at 208 located to the right of the base line indicate inaccuracies in the tooth spacing.

From the above description it is seen that the present invention has provided a novel apparatus whereby work pieces such as gears and the like may be rapidly and accurately checked for proper tooth spacing. More specifically, it is seen that the present invention has provided a novel apparatus for automatically checking work pieces for tooth spacing and for indexing the work piece. Furthermore, with the novel apparatus of the present invention it is seen that the entire periphery of the work piece may be checked without reversing the drive mechanism whereby rapid and economical operation is promoted.

While the preferred embodiment of the present invention has been shown and described herein it is obvious that many structural details may be changed without departing from the spirit and scope of the appended claims.

The invention is claimed as follows:

1. An apparatus for testing gears and the like comprising means for rotatably mounting a gear-like workpiece having a plurality of generally radially extending circumferentially spaced surfaces, support means, a first contact member fixed on said support means and extending generally toward said workpiece mounting means for engaging one of said surfaces, a second contact member mounted on said support means for movement relative to said first contact member and for engaging another of said surfaces and extending generally toward said workpiece mounting means, and means for moving said contact members around an endless path with the contact members continuously extending generally toward said workpiece mounting means and into and out of engagement with said surfaces of a workpiece on said mounting means for testing and indexing the workpiece.

2. An apparatus for testing gears and the like comprising means for rotatably mounting a gear-like workpiece having a plurality of generally radially extending circumferentially spaced surfaces, support means, a first contact member fixed on said support means and extending generally toward said workpiece mounting means for engaging one of said surfaces, a second contact member mounted on said support means for movement relative to said first contact member and for engaging another of said surfaces and extending generally toward said workpiece mounting means, means for moving said contact members around an endless path with the contact members continuously extending generally toward said workpiece mounting means and into and out of engagement with said surfaces of a workpiece on said mounting means for testing and indexing the workpiece, and means actuated by said movable contact member for indicating the results of the testing operation.

3. An apparatus, as defined in claim 2, wherein said indicating means includes means for recording the results of the testing operation.

4. An apparatus for testing gears and the like comprising means for rotatably mounting a gear-like workpiece having a plurality of generally radially extending circumferentially spaced surfaces, support means, a first contact member fixed on said support means for engaging one of said surfaces, a second contact member mounted on said support means for movement relative to said first contact member and for engaging another of said surfaces, and means for simultaneously oscillating said support means about a pivot point and reciprocating said support means and said pivot point for moving said contact members around an endless path into and out of engagement with said surfaces of a rotatably mounted workpiece for testing and indexing a workpiece on said mounting means.

5. An apparatus, as defined in claim 4, which includes means for adjusting said reciprocating and oscillating means to vary the movement of said contact members in accordance with the size of the workpiece being tested.

6. An apparatus for testing gears and the like comprising means for rotatably mounting a gear-like workpiece having a plurality of generally radially extending circumferentially spaced surfaces, support means, a first contact member fixed on said support means for engaging one of said surfaces, a second contact member pivotally mounted on said support means for engaging another of said surfaces, said support means including a reciprocable member and a pivoted member carried by said reciprocable member, and means for oscillating said pivoted member and for simultaneously actuating said reciprocable member, for moving said contact members around an endless path into and out of engagement with said workpiece surfaces for testing and indexing a workpiece on said mounting means.

7. An apparatus for testing gears and the like comprising means for rotatably mounting a gear-like workpiece, a pair of relatively movable contact members having workpiece engaging tips extending generally toward the workpiece mounting means, and means for moving said contact members in unison around an endless path into and out of engagement with pairs of generally radially extending circumferentially spaced surfaces of a workpiece on said mounting means while maintaining said tips extending generally toward said workpiece mounting means for testing and indexing a workpiece on said mounting means, 8. An apparatus, as defined in claim 7, wherein said means for moving said contact members includes means for varying the lineal speed of said contact members, said moving means operating the contact members at a relatively high speed during indexing of the work piece and at a relatively low speed during testing of the workpiece.

9. In a gear testing apparatus, the combination comprising a pair of relatively movable members extending generally in one direction for contacting a pair of circumferentially spaced generally radially extending surfaces of a workpiece gear or the like, and means for moving said contact members around an endless path while continuously extending generally in said one direction and into and out of engagement with pairs of said surfaces of a rotatably supported workpiece for testing and indexing the workpiece.

10. In a gear testing apparatus, the combination comprising support means, a first contact member fixed on said support means, a second contact member mounted on said support means for movement relative to said first contact member, and means for simultaneously oscillating said support means about a pivot point and reciprocating said support means and said pivot point for moving said contact members around an endless path located at one side of said pivot point and into and out of engagement with pairs of generally radially extending circumferentially spaced surfaces of a rotatably mounted workpiece gear or the like for testing and indexing the workpiece.

11. In a gear testing apparatus, the combination comprising a pivotally and reciprocably mounted support member, a plurality of relatively movable contact members on said support member at one side of a pivot point of the support member, and means for reciprocating said support member and said pivot point and simultaneously oscillating said support member about said pivot point for moving said contact members around an endless path located at said one side of said pivot point and into and out of engagement with a plurality of generally radially extending circumferentially spaced surfaces of a rotatably mounted workpiece gear or the like for testing and indexing the workpiece.

References Cited in the file of this patent

UNITED STATES PATENTS

| 1,651,159 | Schurr | Nov. 29, 1927 |
| 1,850,411 | Mitchell | Mar. 22, 1932 |
| 2,124,322 | Tondreau | July 19, 1938 |
| 2,261,093 | Poupitch | Oct. 28, 1941 |
| 2,564,376 | Schwartz | Aug. 14, 1951 |

FOREIGN PATENTS

| 601,612 | Germany | Aug. 20, 1934 |
| 605,041 | Germany | Nov. 2, 1934 |